(12) United States Patent
Hihara et al.

(10) Patent No.: US 7,824,451 B2
(45) Date of Patent: Nov. 2, 2010

(54) DISPERSE DYE MIXTURES WHICH HAVE A HIGH DEGREE OF LIGHT FASTNESS

(75) Inventors: Toshio Hihara, Fukuoka (JP); Wataru Seto, Fukuoka (JP); Koichi Fujisaki, Osaka (JP); Daisuke Hosoda, Osaka (JP); Hiroshi Inoue, Fukuoka (JP)

(73) Assignee: DyStar Textilfarben GmbH & Co. Deutschland KG, Frankfurt am Main (DE)

( * ) Notice: Subject to any disclaimer, the term of this patent is extended or adjusted under 35 U.S.C. 154(b) by 996 days.

(21) Appl. No.: 10/563,198

(22) PCT Filed: Jun. 29, 2004

(86) PCT No.: PCT/EP2004/007021

§ 371 (c)(1),
(2), (4) Date: Jan. 3, 2006

(87) PCT Pub. No.: WO2005/005552

PCT Pub. Date: Jan. 20, 2005

(65) Prior Publication Data

US 2006/0230549 A1    Oct. 19, 2006

(30) Foreign Application Priority Data

Jul. 4, 2003    (JP)    ............................. 2003-192345

(51) Int. Cl.
*D06P 3/82*    (2006.01)
(52) U.S. Cl. .................. 8/534; 8/920; 8/922; 524/190; 525/375; 534/608; 534/757
(58) Field of Classification Search .............. 8/534, 8/533, 549, 640, 641, 643, 639, 662, 691, 8/693, 922; 534/653, 766, 733, 838, 573; 524/190; 525/375
See application file for complete search history.

(56) References Cited

U.S. PATENT DOCUMENTS

| 5,332,404 | A | * | 7/1994 | Himeno et al. | ................. | 8/639 |
| 5,608,042 | A | * | 3/1997 | Himeno et al. | .............. | 534/788 |
| 5,734,028 | A | * | 3/1998 | Himeno et al. | .............. | 534/573 |
| 5,824,118 | A | * | 10/1998 | Akai et al. | ..................... | 8/662 |

FOREIGN PATENT DOCUMENTS

| DE | 198 48 201 | | 4/2000 |
| EP | 0 621 320 | | 10/1994 |
| JP | 4-164969 | | 6/1992 |
| JP | 04-164969 | A * | 6/1992 |
| JP | 06-345989 | A * | 12/1994 |
| JP | 9-176509 | | 7/1997 |
| JP | 10-195328 | | 7/1998 |
| JP | 2002-338636 | | 11/2002 |
| JP | 2004-168950 | | 6/2004 |

* cited by examiner

Primary Examiner—Harold Y Pyon
Assistant Examiner—Bijan Ahvazi
(74) Attorney, Agent, or Firm—Connolly Bove Lodge & Hutz LLP

(57) ABSTRACT

The present invention provides a blue dye mixture which contains the pigments represented by formulae [1], [2], [3], and [4]

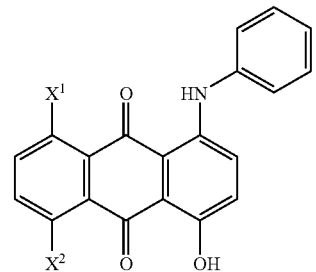

(1)

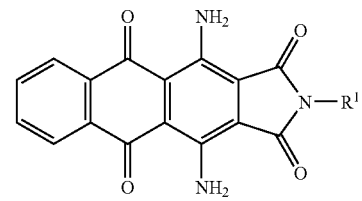

(2)

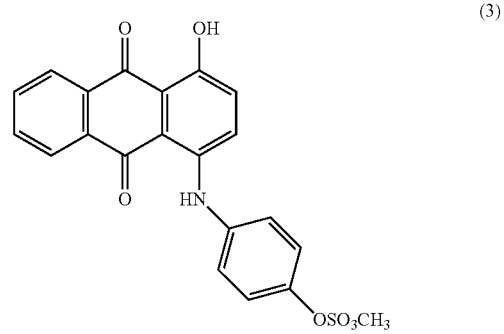

(3)

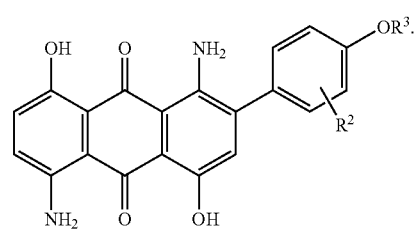

(4)

The present invention also relates to dye mixtures in which there are compounded therewith a yellow dye mixture and/or a red dye mixture. The invention further relates to a method of dyeing polyester-based fibers and dyed polyester-based fibers and dyed polyester-based fiber materials.

11 Claims, No Drawings

DISPERSE DYE MIXTURES WHICH HAVE A HIGH DEGREE OF LIGHT FASTNESS

RELATED APPLICATIONS

This application is a national stage application (under 35 U.S.C. 371) of PCT/EP2004/007021 filed Jun. 29, 2004 which claims benefit to Japanese application 2003-192345 filed Jul. 4, 2003.

The invention concerns disperse dyes for dyeing polyester-based fibers. In particular, the invention concerns disperse dye mixtures which have good fastness even on polyester-based fibers of fine denier which are disadvantageous in terms of light fastness, and with which mixed fibers where the thickness of the polyester-based fibers differs (mixed fibers of different fineness) or fiber mixtures comprising polyester-based fibers which can be dyed with cationic dyes and regular polyester-based fibers can be dyed the same color.

Cloths comprising polyester-based fibers are often used as the material for automobile seats, but more recently a demand has arisen for richer seat colors as more emphasis has been placed on the fashion aspect of the interior furnishing of automobiles. However, automobile seats are often exposed to high temperatures and sunlight when the cabin is closed and so color fading of the seats is liable to arise and it is difficult to ensure that the beautiful color will be retained over a prolonged period of time. Disperse dyes are generally used for dyeing polyester-based fibers, but dyes which have especially good light fastness must be used in the case of automobile seat applications. Moreover, more recently there have been many cases where fine denier polyester-based fibers have been used for automobile seat materials, and when these are dyed using the same dyes it is observed that the light fastness is worse than that observed when regular polyester-based fibers have been used. Against the background of these facts a demand has arisen at the present time for dyes for automobile seats which have better light fastness than that in the past.

In the past no dye which had good light fastness and with which dyeing could be carried out with good reproducibility with these fine denier polyester-based fibers in particular had been discovered. Then, the present inventors took up this problem and Japanese Patent Application 2002-338636 was made.

More recently, from the viewpoint of the diversity of taste and fashion, automobile interior furnishings comprising mixed fibers comprising polyester-based fibers of different thickness and automobile interior furnishings comprising polyester-based fibers which can be dyed with cationic dyes and regular polyester-based fibers have been produced.

Dyes of the three primary colors designed for automobile interior furnishings were known in the past (for example, see Japanese Unexamined Patent Application Laid Open H4-164969 and Japanese Unexamined Patent Application Laid Open H9-176509), but even when these dyes are used it is difficult at the present time to dye these automobile internal furnishings, and especially car seats, the same color with good reproducibility and with excellent light fastness.

The present invention is based on an understanding of the facts outlined above and is intended to provide disperse dye mixtures with which polyester-based fibers, and especially fine denier polyester-based fibers, can be dyed with good light fastness, and which are suitable for dyeing polyester-based fiber mixtures of different thickness (mixed fibers of different fineness) or polyester-based fibers comprising polyester-based fibers which can be dyed with cationic dyes and regular polyester-based fibers the same color and with good reproducibility.

The inventors have discovered that blue dye mixtures, yellow dye mixtures and red dye mixtures which have excellent light fastness are obtained by mixing specified dyes in certain proportions, and that when these are used as compound colors, not only is the light fastness excellent but the dyeing rates of each color are matched, and polyester-based fibers of different thickness or polyester-based fibers comprising polyester-based fibers which can be dyed with cationic dyes and polyester-based fibers can be dyed the same color and with good reproducibility easily, and the invention is based upon this discovery.

Thus, the invention comprises a blue colored dye mixture which contains from 10 to 60 wt % with respect to the total pigment fraction of a blue pigment which is a mixture of the two isomers which can be represented by structural formula [1]

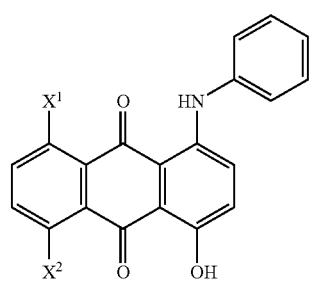

(1)

wherein one of $X^1$ and $X^2$ represents $NO_2$ and the other represents OH, from 60 to 10 wt % with respect to the total pigment fraction of a blue pigment which can be represented by structural formula [2]

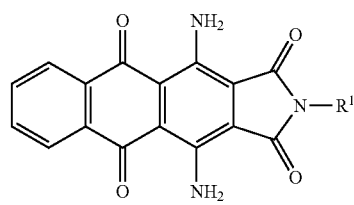

(2)

wherein $R^1$ represents $-C_3H_6OCH_3$, $-C_3H_6OC_2H_5$ or $-C_3H_6OC_2H_4OCH_3$, from 10 to 30 wt % with respect to the total pigment fraction of the blue pigment which can be represented by structural formula [3]

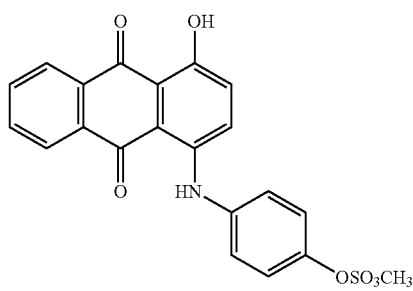

(3)

and from 20 to 0 wt % with respect to the total pigment fraction of a blue pigment which can be represented by structural formula [4]

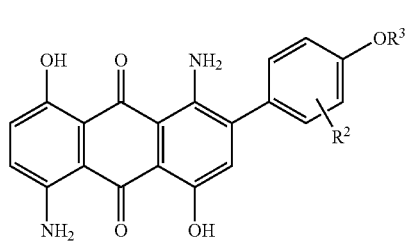
(4)

wherein $R^2$ represents a hydrogen atom or a $C_1$ or $C_2$ alkyl group, and $R^3$ represents a hydrogen atom, a $C_1$ or $C_2$ alkyl group or a $C_1$ or $C_2$ alkoxy $C_1$ or $C_2$ alkyl group.

The invention further comprises a dye composition in which, in a blue dye mixture as disclosed above, there is compounded the yellow dye mixture indicated below and/or the red dye mixture indicated below.

The yellow dye mixture contains from 25 to 75 wt % with respect to the whole pigment fraction of the yellow pigment which can be represented by structural formula [5]

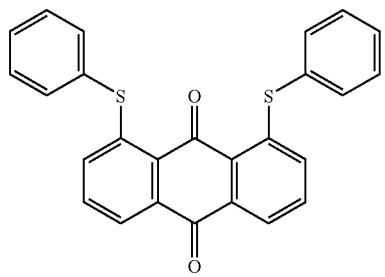
(5)

from 60 to 20 wt % with respect to the whole pigment fraction of the yellow pigment which can be represented by structural formula [6]

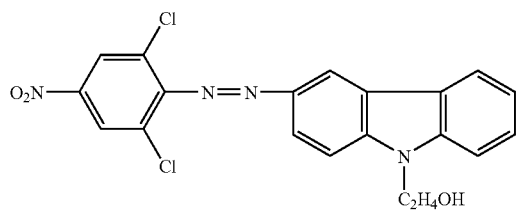
(6)

and from 15 to 5 wt % with respect to the whole pigment fraction of the yellow pigment which can be represented by structural formula [7]

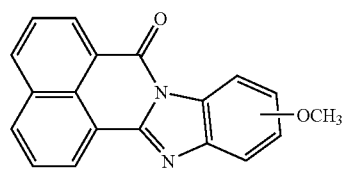
(7)

The red dye mixture contains from 30 to 60 wt % with respect to the whole pigment fraction of a red pigment which can be represented by structural formula [8]

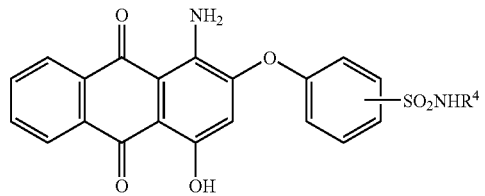
(8)

wherein $R^4$ represents a $C_1$ to $C_3$ alkoxy $C_1$ to $C_3$ alkyl group, from 70 to 20 wt % with respect to the whole pigment fraction of the red pigment which can be represented by the structural formula [9]

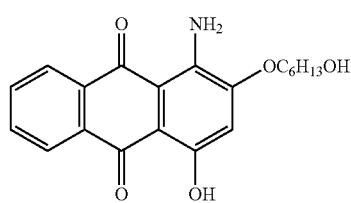
(9)

and from 0 to 20 wt % with respect to the whole pigment fraction of a red pigment which can be represented by structural formula [10]

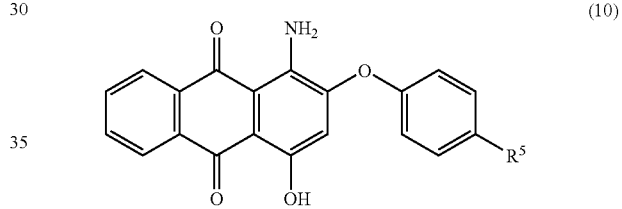
(10)

wherein $R^5$ represents a hydrogen atom, a chlorine atom or a bromine atom, or [11]

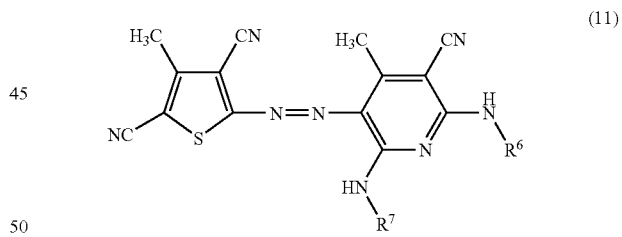
(11)

wherein one of $R^6$ and $R^7$ is a hydrogen atom and the other is hydroxyethoxyethyl, hydroxybutoxypropyl, acetoxyethoxyethyl or acetoxybutoxypropyl.

The invention further comprises a method of dyeing polyester-based fibers in which a dye mixture as disclosed above is used, and the dyed materials obtained by this means.

In a preferred method of dyeing the polyester-based fibers are mixed fibers of different fineness or mixed fibers comprising polyester-based fibers which can be dyed with cationic dyes and regular polyester-based fibers, and the dyed materials obtained by this means.

The invention is described in more detail below.

The blue dye mixture in this invention contains the blue pigments represented by the aforementioned structural formulae [1], [2], [3] and [4] in proportions with respect to the total pigment fraction of (from 10 to 60 wt %)/(from 60 to 10 wt %)/(from 10 to 30 wt %)/(from 20 to 0 wt %), respectively. With just the pigments represented by structural formulae [1] and [2] the color is blue-green, but by adding the compound which can be represented by structural formula [3] it is possible to obtain a mid-blue color which can be used easily when using a single color and when using a compound color, while maintaining good light fastness. Mixtures with the proportions (from 30 to 50 wt %)/(from 50 to 15 wt %)/(from 15 to 25 wt %)/(from 5 to 10 wt %) are most desirable.

Furthermore, the yellow dye mixtures contain the pigments represented by the aforementioned structural formulae [5], [6] and [7] in proportions with respect to the total pigment fraction of (from 25 to 75 wt %)/(from 60 to 20 wt %)/(from 15 to 5 wt %), respectively, and preferably of (from 40 to 60 wt %)/(from 50 to 25 wt %)/(from 10 to 15 wt %), and the red dye mixtures contain the pigments represented by the aforementioned structural formulae [8], [9] and [10] or [11] in proportions with respect to the total pigment fraction of (from 30 to 60 wt %)/(from 70 to 20 wt %)/(from 0 to 20 wt %), respectively, and preferably of (from 40 to 55 wt %)/(from 50 to 25 wt %)/(from 10 to 20 wt %).

By mixing these various pigments the dyeing rate can be made to conform more closely with the aforementioned blue dye mixture. Disperse dyes in an amount up to 5 wt % where there is no loss of the effect of the invention can be added to and included in the respective blue, yellow and red dye mixtures as color shading components for correcting the color shade.

Furthermore, each color mixture can be compounded and used in any proportion for dyeing to the desired color shade. In this case, the dyeing rates of each color on each type of polyester-based fiber are made to conform and as a result the dyeing process is simple.

Ultraviolet absorbers can be used conjointly with the dye mixtures of this invention, but dyed material which has satisfactory light fastness can be obtained without their particular use. Moreover, dyeing can also be carried out under alkaline conditions which are used as a precipitated polyester oligomer countermeasure.

The pigments represented by the aforementioned structural formulae [1] to [10] are insoluble or sparingly soluble in water and so for dyeing polyester-based fibers using the dyes of this invention a dye bath or printing paste where the dyes which have been formed into fine particles and dispersed in an aqueous medium using, for example a condensate of naphthalene sulfonic acid and formaldehyde, a higher alcohol sulfuric acid ester or higher alkylbenzenesulfonic acid salt as a dispersing agent in the usual way is prepared and the dyeing is carried out by dip-dyeing or printing. The dip-dyeing method is especially desirable. In the case of dip-dyeing it is possible to dye polyester-based fibers or mixed weave products with excellent light fastness if a normal dyeing process is carried out using, for example, the high temperature dyeing method, the carrier dyeing method or the thermosol dyeing method.

The polyester-based fibers are described below.

The generally well-known fibers comprising polyethylene terephthalate, polytrimethylene terephthalate and polybutylene terephthalate and the polylactic acid fibers comprising aliphatic polyesters which are known as biodegradable polyester-based fibers can be cited as polyester-based fibers which can be dyed with the dyes of this invention. Moreover, the polyester-based fibers which can be dyed with cationic dyes at normal pressure obtained by copolymerizing 5-sulfonatosodiumisophthalic acid can also be cited. Moreover, polyester-based fibers obtained by mixing the various types of polyester-based fibers mentioned above can also be dyed effectively.

The dye mixtures of this invention demonstrate their effect in particular when dyeing polyester-based fibers comprising very fine fibers of 1.0 denier or below, mixed polyester-based fibers comprising very fine fibers and fibers of from 1 to 5 denier, and mixed fibers comprising polyester-based fibers which can be dyed with cationic dyes and regular polyester-based fibers.

ILLUSTRATIVE EXAMPLES

The invention is described in more practical terms below by means of examples and comparative examples, but the invention is not limited by these examples.

Examples 1 to 12 and Comparative Examples 1 and 2

Dye mixtures which contained pigments represented by the structural formulae [1-1], [1-2], [2-1], [2-2], [2-3], [3], [4-1], [4-2], [4-3] and [4-4] indicated below in the proportions shown in Table 1 were prepared.

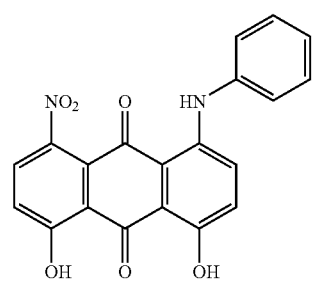

Structural Formula [1-1]

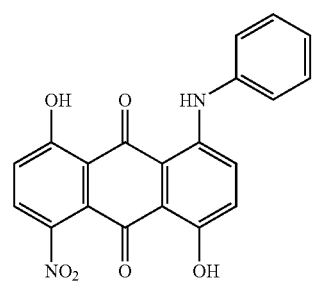

Structural Formula [1-2]

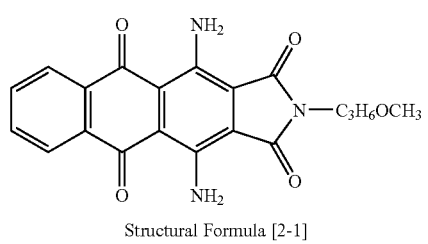

Structural Formula [2-1]

-continued

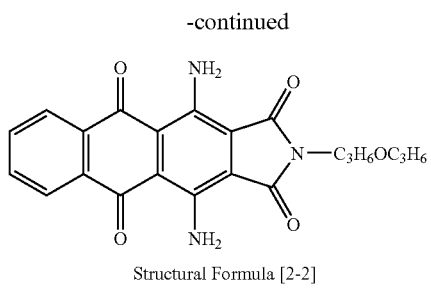

Structural Formula [2-2]

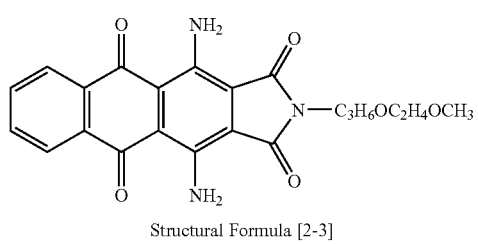

Structural Formula [2-3]

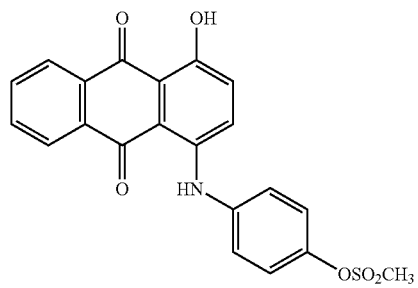

Structural Formula [3]

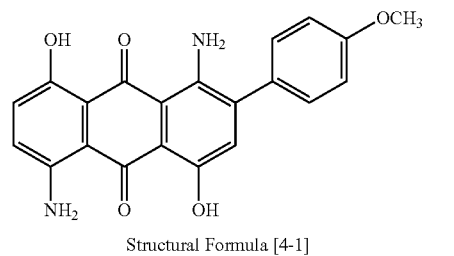

Structural Formula [4-1]

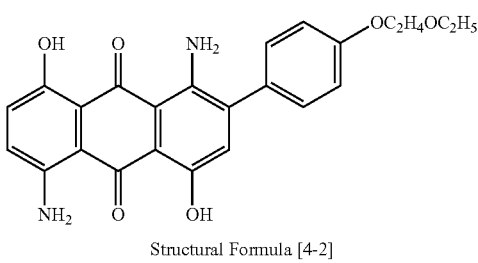

Structural Formula [4-2]

-continued

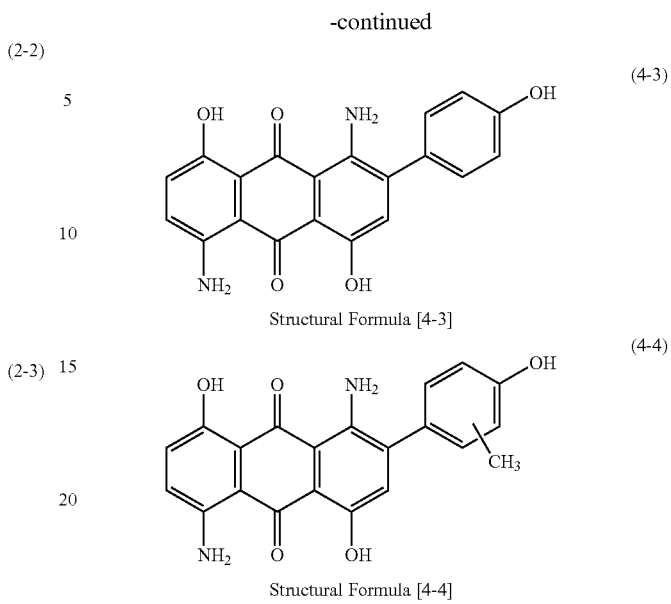

Structural Formula [4-3]

Structural Formula [4-4]

The dye mixtures were mixed with an equal weight of dispersing agent comprising naphthalenesulfonic acid formaldehyde condensate or higher alcohol sulfuric acid ester or the like and then formed into fine particles and dried in the usual way, and blue dye mixtures were obtained.

Dye baths were prepared by dispersing 50 mg of the blue dye mixture in 100 ml of water which contained dye promoter and acetic acid/sodium acetate pH buffer solution and 5 g samples of 0.3 denier polyester-based fiber cloth for car seat purposes were immersed in the dye bath and dyed for 30 minutes at 135° C., after which they were subjected to a reducing rinse, a water rinse and drying in the usual way, and blue dyed materials were obtained.

The light fastness of the dyed materials was assessed using the light fastness test standards of the Toyota Automobile Co. Ltd., and the results were as shown in Table 1.

As shown in the table, the light fastness of all of the dyed materials obtained in Examples 1 to 12 exhibited a good value at grade 4.

Dyed materials were then obtained in the same way as in the examples using Dianix® Blue KIS-U and Dianix® Blue KIS-M which are high light-fastness blue dyes produced by DyStar Textilfarben GmbH & Co. Deutschland KG (Dianix® is a registered trademark of DyStar Textilfarben GmbH & Co. Deutschland KG) and the same tests were carried out, and the results were as shown in Table 2.

On comparing Tables 1 and 2 it is clear that better results were obtained in the case of Examples 1 to 12.

Next, evaluations were carried out for all the abovementioned dyes in the same way for cases where 2% (o.w.f) "Cibafast P" produced by Ciba Specialty Chemicals Co. Ltd. as an ultraviolet absorber had been added to the dye baths, and these results are also shown in each table.

As shown by these results, some improvement in light fastness was seen in Examples 1 to 12. On the other hand, in Comparative Examples 1 and 2 about half a grade improvement was seen but even then there was only improvement to the same level as in Examples 1 to 12 when the ultraviolet absorber had not been added.

This shows that dyed materials of very superior light fastness are obtained by means of the invention.

TABLE 1

| Pigment wt % | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|
| [1-1] | 40 | 38 | 25 | 50 | 30 | 45 | 15 | 40 | 35 | 30 | 30 | 55 |
| [1-2] | 5 | 3 | 5 | 3 | 5 | 2 | 3 | 1 | 5 | 5 | 5 | 4 |
| [2-1] | 40 | — | — | 22 | 50 | 15 | 30 | 29 | — | 35 | — | — |
| [2-2] | — | 33 | — | — | — | 20 | — | — | 25 | — | — | 20 |
| [2-3] | — | — | 45 | 15 | — | — | 27 | — | — | — | 50 | — |
| [3] | 15 | 21 | 25 | 10 | 15 | 18 | 25 | 20 | 20 | 20 | 10 | 12 |
| [4-1] | — | — | — | — | — | — | — | 10 | — | — | — | 3 |
| [4-2] | — | — | — | — | — | — | — | — | 15 | — | — | — |
| [4-3] | — | — | — | — | — | — | — | — | — | 10 | — | 3 |
| [4-4] | — | — | — | — | — | — | — | — | — | — | 5 | 3 |
| Light Fastness (Without Ultraviolet Absorber) | 4 | 4 | 4 | 4 | 4 | 4 | 4 | 4 | 4 | 4 | 4 | 4 |
| Light Fastness (With Ultraviolet Absorber) | 4+ | 4+ | 4+ | 4+ | 4+ | 4+ | 4+ | 4+ | 4+ | 4+ | 4+ | 4+ |

TABLE 2

| | Comparative Example 1 Dianix Blue KIS-U | Comparative Example 2 Dianix Blue KIS-M |
|---|---|---|
| Light Fastness (Without Ultraviolet Absorber) | 3-4− | 3 |
| Light Fastness (With Ultraviolet Absorber) | 4 | 3-4+ |

Moreover, the light fastness test was carried out using a high energy xenon fadometer manufactured by the Suga Shikenki Co. Ltd. for the testing apparatus under conditions of radiation intensity 150 W/m² (300-400 nm) with the light/dark method with 38 cycles (182 hours), taking radiation time 3.8 hours/dark time 1 hour as 1 cycle, at a black panel temperature of 73±3° C. The tests were carried out with the test cloth lined with urethane. The grading assessment was carried out using the gray scale for color fading purposes of JIS L 0804.

Examples 13 to 27 and Comparative Examples 3 to 10

Color Sameness Tests

The pigments represented by the structural formula [5], [6], [7] and [A-1] indicated below as yellow pigments, the pigments represented by the structural formulae [8-1], [8-2], [9], [10-1], [10-2], [10-3], [11], [B-1] and [B-2] indicated below as red pigments and the pigments represented by the structural formulae [1], [2], [3], [4-1], [4-2], [4-3] and [4-4] indicated below as blue pigments were mixed in proportions as shown in Table 3-1, Table 3-2 and Table 3-3 respectively and the dye mixtures were mixed with an equal weight of a dispersing agent comprising a naphthalene sulfonic acid formaldehyde condensate and higher alcohol sulfuric acid ester and the like and then formed into fine particles and dried in the usual way, and yellow dye mixtures, red dye mixtures and blue dye mixtures were obtained.

Dye baths were prepared by dispersing 20 mg of a yellow dye mixture, 10 mg of a red dye mixture and 20 mg of a blue dye mixture in 100 ml of water which contained dye promoter and acetic acid/sodium acetate pH buffer solution and 5 g samples of car seat polyester cloth were immersed in these baths and dyed for 30 minutes at 135° C., and then subjected to a reducing rinse, a water rinse and drying in the usual way and gray dyed materials were obtained.

Moreover double-weave materials with threads of different fineness where the front comprised 0.5 denier polyethylene terephthalate fibers and the back comprised 2.0 denier polyethylene terephthalate fibers were used in Examples 13 to 22 and Comparative Examples 3 to 7.

Mixed fiber double-weave materials where the front comprised 1.0 denier polyethylene terephthalate fibers and the back comprised 3.0 denier polyester-based fibers which could be dyed with cationic dyes were used in Examples 23 to 27 and Comparative Examples 8 to 10.

The light fastness was assessed on both sides. Moreover, the color difference between the front and back surfaces was assessed visually.

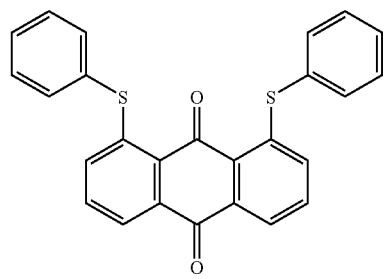

Structural Formula [5]

(5)

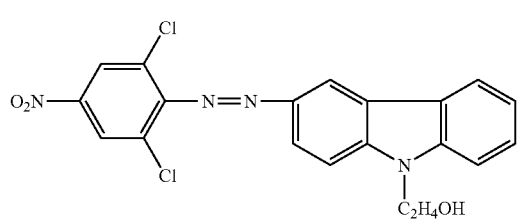

Structural Formula [6]

(6)

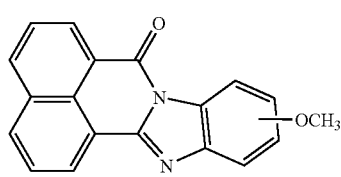

Structural Formula [7]

(7)

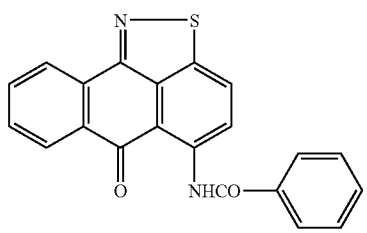
Structural Formula [A-2]

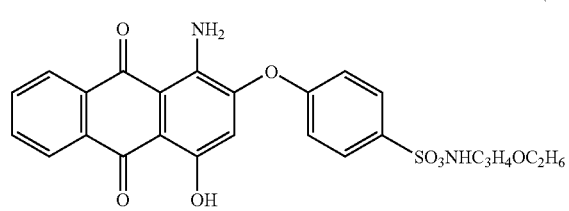
Structural Formula [8-1]

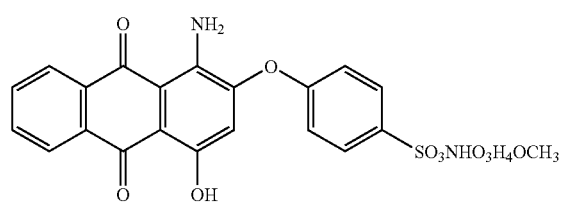
Structural Formula [8-2]

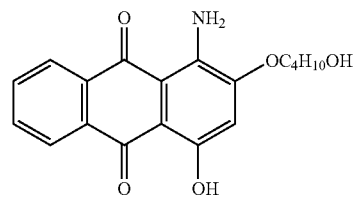
Structural Formula [9]

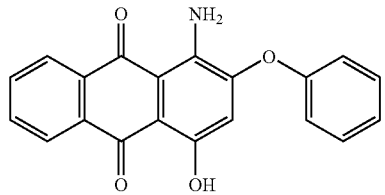
Structural Formula [10-1]

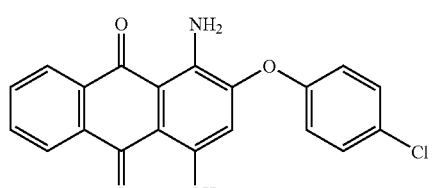
Structural Formula [10-2]

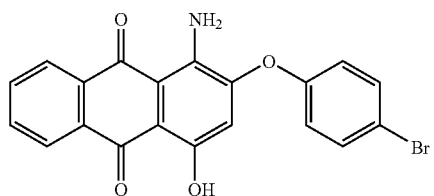
Structural Formula [10-3]

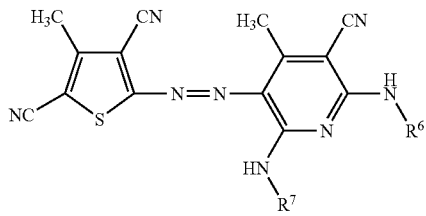
Structural Formula [11]

A mixture of the compounds where in this formula either one of $R^6$ and $R^7$ represents a hydrogen atom and the other represents hydroxyethoxyethyl, hydroxybutoxypropyl, acetoxyethoxyethyl or acetoxybutoxypropyl.

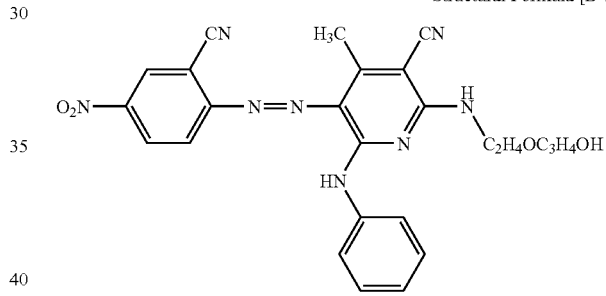
Structural Formula [B-1]

A 1:1 mixture of the two pigment compounds indicated above.

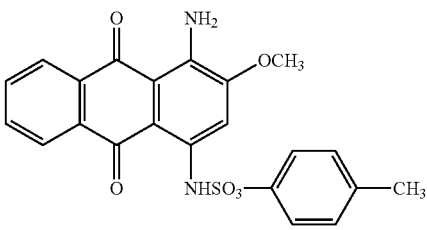
Structural Formula [B-2]

TABLE 3-1

| Pigment Wt % | | Example 13 | Example 14 | Example 15 | Example 16 | Example 17 | Example 18 | Example 19 | Example 20 | Example 21 |
|---|---|---|---|---|---|---|---|---|---|---|
| Blue | [1-2] | 40 | 40 | 40 | 40 | 45 | 35 | 15 | 55 | 45 |
| | [1-2] | 1 | 1 | 1 | 1 | — | 5 | 5 | 5 | 5 |
| | [2-1] | 29 | 29 | 29 | 29 | 40 | 25 | 50 | 10 | 30 |
| | [3] | 20 | 20 | 20 | 20 | 15 | 25 | 20 | 20 | 15 |
| | [4-1] | 10 | — | — | — | — | 10 | 10 | — | — |
| | [4-2] | — | — | 10 | — | — | — | — | 10 | — |
| | [4-3] | — | — | — | 10 | — | — | — | — | — |
| | [4-4] | — | 10 | — | — | — | — | — | — | 5 |
| Yellow | [5] | 55 | 55 | 55 | 60 | 50 | 50 | 50 | 50 | 50 |
| | [6] | 35 | 35 | 35 | 30 | 35 | 35 | 35 | 35 | 35 |
| | [7] | 10 | 10 | 10 | 10 | 15 | 15 | 15 | 15 | 15 |
| | [A-1] | — | — | — | — | — | — | — | — | — |
| Red | [8-1] | — | — | — | 20 | — | — | 10 | — | — |
| | [8-2] | 60 | 45 | 45 | 20 | 60 | 45 | 25 | 50 | 50 |
| | [9] | 40 | 45 | 40 | 40 | 30 | 40 | 50 | 35 | 50 |
| | [10-1] | — | 10 | 15 | — | — | 15 | 15 | 5 | — |
| | [10-2] | — | — | — | — | 10 | — | — | 5 | — |
| | [10-3] | — | — | — | 20 | — | — | — | 5 | — |
| | [11] | — | — | — | — | — | — | — | — | — |
| | [B-1] | — | — | — | — | — | — | — | — | — |
| | [B-2] | — | — | — | — | — | — | — | — | — |
| Light Fastness (Without Ultraviolet Absorber) | | 4 | 4 | 4 | 4 | 4 | 4 | 4 | 4 | 4 |
| Sameness of Color | | Δ | ○ | ○ | ○ | ○ | ○ | ○ | ○ | Δ |

Results of Assessment of Sameness of Color:
○: Good match,
Δ: Matched to a certain extent,
X: Did not match and there was a marked difference in color.

TABLE 3-2

| Pigment Wt % | | Example 22 | Example 23 | Example 24 | Example 25 | Example 26 | Example 27 |
|---|---|---|---|---|---|---|---|
| Blue | [1-2] | 40 | 40 | 40 | 50 | 50 | 35 |
| | [1-2] | 1 | 5 | 5 | — | — | 5 |
| | [2-1] | 29 | 25 | 25 | 25 | 25 | 30 |
| | [3] | 20 | 20 | 20 | 15 | 15 | 20 |
| | [4-1] | — | 10 | 10 | — | — | 5 |
| | [4-2] | — | — | — | — | — | — |
| | [4-3] | 10 | — | — | 10 | 10 | — |
| | [4-4] | — | — | — | — | — | 5 |
| Yellow | [5] | 60 | 55 | 50 | 40 | 40 | 55 |
| | [6] | 30 | 36 | 32 | 45 | 45 | 35 |
| | [7] | 10 | 9 | 13 | 15 | 15 | 10 |
| | [A-1] | — | — | — | — | — | — |
| Red | [8-1] | 20 | — | 20 | 45 | 45 | — |
| | [8-2] | 20 | 60 | 30 | — | — | 50 |
| | [9] | 40 | 40 | 40 | 40 | 40 | 35 |
| | [10-1] | — | — | 10 | 15 | — | 5 |
| | [10-2] | — | — | — | — | — | 5 |
| | [10-3] | — | — | — | — | — | 5 |
| | [11] | 20 | — | — | — | 15 | — |
| | [B-1] | — | — | — | — | — | — |
| | [B-2] | — | — | — | — | — | — |
| Light Fastness (Without Ultraviolet Absorber) | | 4 | 4 | 4 | 4 | 4 | 4 |
| Sameness of Color | | ○ | Δ | ○ | ○ | ○ | ○ |

Results of Assessment of Sameness of Color:
○: Good match
Δ: Matched to a certain extent
X: Did not match and there was a marked difference in color

TABLE 3-3

| Pigment Wt % | | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|---|
| Blue | [1-2] | 40 | 40 | 40 | 40 | 40 | 40 | 40 | 40 |
| | [1-2] | 1 | 1 | 1 | 1 | 1 | 1 | 1 | 1 |
| | [2-1] | 29 | 29 | 29 | 29 | 29 | 29 | 29 | 29 |

TABLE 3-3-continued

| Pigment Wt % | | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|---|
| | [3] | 20 | 20 | 20 | 20 | 20 | 20 | 20 | 20 |
| | [4-1] | 10 | 10 | 10 | 10 | 10 | 10 | 10 | 10 |
| | [4-2] | — | — | — | — | — | — | — | — |
| | [4-3] | — | — | — | — | — | — | — | — |
| | [4-4] | — | — | — | — | — | — | — | — |
| Yellow | [5] | 90 | — | 55 | 55 | 55 | 90 | 55 | 55 |
| | [6] | 5 | 35 | 35 | 35 | 35 | 5 | 35 | 35 |
| | [7] | 5 | 10 | 10 | 10 | 10 | 5 | 10 | 10 |
| | [A-1] | — | 55 | — | — | — | — | — | — |
| Red | [8-1] | — | — | — | — | — | — | — | — |
| | [8-2] | 45 | 45 | — | 60 | 90 | 45 | — | 45 |
| | [9] | 40 | 40 | 40 | — | 10 | 40 | 40 | — |
| | [10-1] | 15 | 15 | 20 | — | — | 15 | 20 | 15 |
| | [10-2] | — | — | — | — | — | — | — | — |
| | [10-3] | — | — | — | — | — | — | — | — |
| | [11] | — | — | — | — | — | — | — | — |
| | [B-1] | — | — | 40 | — | — | — | 40 | — |
| | [B-2] | — | — | — | 40 | — | — | — | 40 |
| Light Fastness (Without Ultraviolet Absorber) | | 4 | 4 | 4 | 4 | 4 | 4 | 4 | 4 |
| Sameness of Color | | X | X | X | X-Δ | X | X | X | X-Δ |

Results of Assessment of Sameness of Color:
○: Good match,
Δ: Matched to a certain extent,
X: Did not match and there was a marked difference in color.

As is clear from Tables 3-1, 3-2 and 3-3, dyed materials of uniform color which had excellent light fastness were obtained by using blue, yellow and red dye mixtures of this invention.

Furthermore, as is clear from Comparative Example 3, if, even when yellow pigments of the three types used in the invention are being used, the compositional proportions are outside the range of this invention, the light fastness is the same but the sameness of color is markedly worse.

Furthermore, as is clear from Comparative Example 10, the sameness of color is markedly worse in those cases where other anthraquinone pigment outside the scope of the invention is used in the red dye mixture.

From the facts outlined above it is clear that dyed materials which have firstly excellent light fastness and uniformity of color can be obtained with the specified pigment combinations and specified compound compositions of this invention.

Examples 28 and 29

Dyeing was carried out in the same way as in Example 10 except that the 0.3 denier polyethylene terephthalate fibers in Example 10 were replaced with 0.5 or 1.5 denier fibers respectively. The results were good with light fastness of grade 4 and grade 4-5 respectively.

Examples 30 and 31

Dyeing was carried out in the same way as in Example 10 except that the 0.3 denier polyethylene terephthalate fibers in Example 10 were replaced with 1.5 denier polytrimethylene terephthalate fibers and polybutylene terephthalate fibers. The light fastness of the dyed materials obtained as a result was good at grade 4 in each case.

EFFECT OF THE INVENTION

Polyester-based fiber dyed materials which have excellent light fastness are obtained by using a specified three primary color blue dye mixture, yellow dye mixture and red dye mixture in accordance with the present invention. Furthermore, mixed fibers where the fiber thickness differs and mixed fibers comprising polyester-based fibers which can be dyed with cationic dyes and regular polyester-based fibers can be dyed the same color with excellent light fastness.

The invention claimed is:

1. A blue colored dye mixture which contains
from 10 to 60 wt % with respect to the total pigment fraction of a blue pigment which is a mixture of the two isomers represented by structural formula (1)

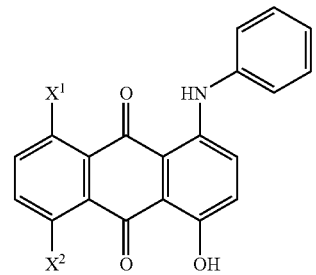

(1)

wherein one of $X^1$ and $X^2$ represents $NO_2$ and the other represents OH, from 60 to 10 wt % with respect to the total pigment fraction of a blue pigment represented by structural formula (2)

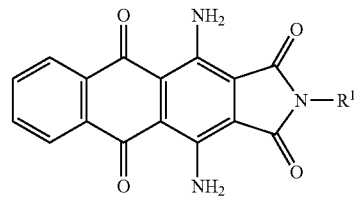

(2)

wherein R¹ represents —C₃H₆OCH₃, —C₃H₆OC₂H₅ or —C₃H₆OC₂H₄OCH₃, and from 10 to 30 wt % with respect to the total pigment fraction of the blue pigment which can be represented by structural formula (3)

(3)

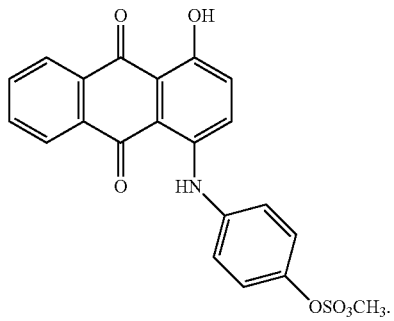

2. A dye composition which comprises the blue dye mixture according to claim 1, and a yellow dye mixture and/or a red dye mixture, wherein the yellow dye mixture contains from 25 to 75 wt % with respect to the whole pigment fraction of the yellow pigment represented by structural formula (5)

(5)

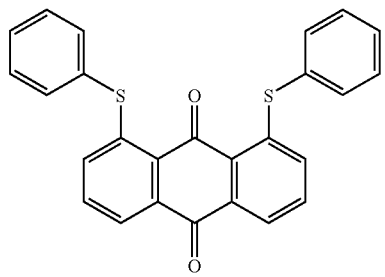

from 60 to 20 wt % with respect to the whole pigment fraction of the yellow pigment represented by structural formula (6)

(6)

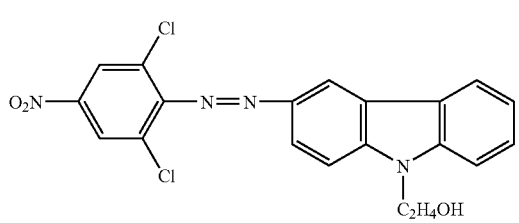

and from 15 to 5 wt % with respect to the whole pigment fraction of the yellow pigment represented by structural formula (7)

(7)

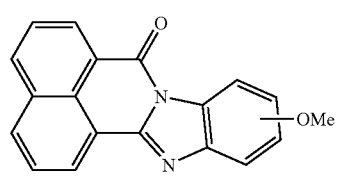

Me represents CH₃, and the red dye mixture contains from 30 to 60 wt % with respect to the whole pigment fraction of a red pigment represented by structural formula (8)

(8)

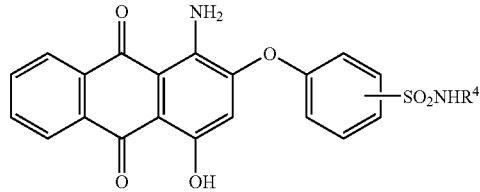

wherein R⁴ represents a C₁ to C₃ alkoxy C₁ to C₃ alkyl group, from 70 to 20 wt % with respect to the whole pigment fraction of the red pigment represented by the structural formula (9)

(9)

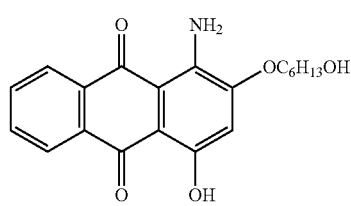

and from 0 to 20 wt % with respect to the whole pigment fraction of a red pigment represented by structural formula (10)

(10)

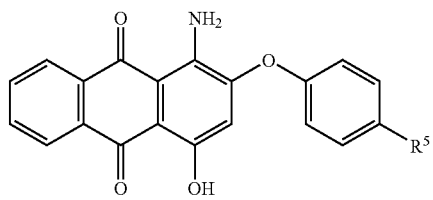

wherein R⁵ represents a hydrogen atom, a chlorine atom or a bromine atom, or by the structural formula (11)

(11)

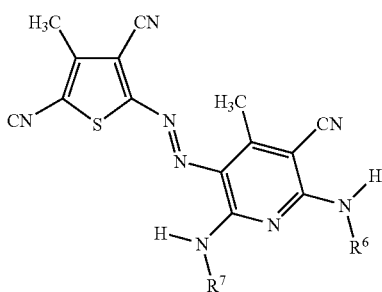

wherein one of R⁶ and R⁷ is a hydrogen atom and the other is hydroxyethoxyethyl, hydroxybutoxypropyl, acetoxyethoxyethyl or acetoxybutoxypropyl.

3. A method of dyeing polyester-based fibers which comprises contacting the fibers with the composition as claim in claim 2.

4. A dyed polyester-based fiber material which has been dyed using the dye composition as claimed in claim 2.

5. A method of dyeing polyester-based fibers according to claim 4 in which the polyester-based fibers are mixed fibers of different fineness.

6. A dyed polyester-based fiber material according to claim 5 in which the polyester-based fibers are mixed fibers of different fineness.

7. A dyed polyester-based fiber material according to claim 6 in which the polyester-based fibers are mixed fibers comprising polyester-based fibers which can be dyed with a cationic dye and regular polyester-based fibers.

8. A method of dyeing polyester-based fibers according to claim 5 in which the polyester-based fibers are mixed fibers comprising polyester-based fibers which can be dyed with a cationic dye and regular polyester-based fibers.

9. A method of dyeing polyester-based fibers which comprises contacting the fibers with the blue dye mixture as claimed in claim 1 with the fibers.

10. A dyed polyester-based fiber material which has been dyed using a blue dye mixture as claimed in claim 1.

11. A blue colored dye mixture which consists essentially of from 10 to 60 wt % with respect to the total pigment fraction of a blue pigment which is a mixture of the two isomers represented by structural formula (1)

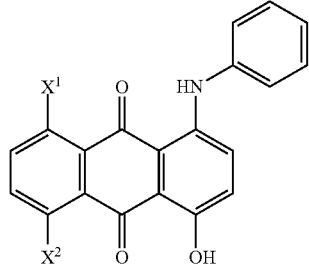

(1)

wherein one of $X^1$ and $X^2$ represents $NO_2$ and the other represents OH, from 60 to 10 wt % with respect to the total pigment fraction of a blue pigment represented by structural formula (2)

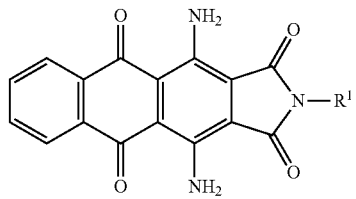

(2)

wherein $R^1$ represents —$C_3H_6OCH_3$, —$C_3H_6OC_2H_5$ or —$C_3H_6OC_2H_4OCH_3$, and from 10 to 30 wt % with respect to the total pigment fraction of the blue pigment which can be represented by structural formula (3)

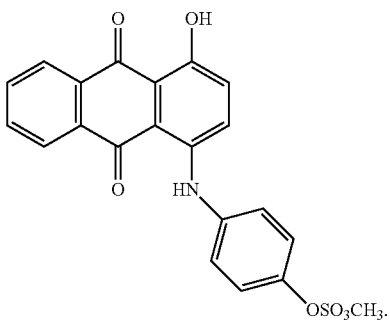

(3)

* * * * *